Oct. 7, 1958  H. H. CHUN  2,855,535
GRID STRUCTURE FOR HYDROGEN THYRATRON
Filed Nov. 5, 1954

INVENTOR.
HERBERT H. CHUN
BY
ATTORNEY

2,855,535

GRID STRUCTURE FOR HYDROGEN THYRATRON

Herbert H. Chun, Marblehead, Mass., assignor to Bomac Laboratories Inc., Beverly, Mass., a corporation of Massachusetts Application November 5, 1954, Serial No. 467,069

2 Claims. (Cl. 313—188)

The present invention relates to hydrogen-filled thyratron devices and, more particularly, to improved grid structure for such devices.

The hydrogen thyratron is a grid-controlled gaseous rectifying device employed as a high voltage switch to trigger the modulator for pulsing magnetron oscillators in radar systems. Such tubes are designed to withstand high voltages, in some instances up to 16,000 volts, without passing current until such time as sufficient grid potential is built up to cause a gaseous discharge in the region between the grid and cathode. Due to the intensity of the discharge vaporized cathode coating particles may migrate to the glass envelope and form deposits thereon. These deposits apparently trap a certain amount of the hydrogen gas on the relatively cooler surface of the glass bulb, thereby contributing to the phenomenon referred to in the art as hydrogen clean-up which appreciably shortens tube life. The cathode coating commonly employed in tubes of this class is composed of barium, strontium and calcium. The hydrogen apparently unites physically and chemically with such materials to form hydride deposits on the bulb surface.

To maintain the gas pressure during life, various solutions have been proposed in the art, such as the use of hydrogen reservoirs. See for example U. S. Patent 2,497,911, dated February 21, 1950, and U. S. Patent 2,582,282, dated January 15, 1952. Such devices, however, require additional processing and may be subject to breakage where they are externally mounted.

I have discovered that coating deposits may be considerably reduced by the provision of a double layer of grid mesh surrounding the cathode-grid-anode region. Vaporized particles are prevented from migrating and are trapped by the overlying mesh layer. Since the temperature in the discharge region is higher than that at the envelope surface, hydrogen gas will not be trapped by the coating particles. Tube life is increased proportionately by preventing hydrogen clean-up.

It is, therefore, an object of the invention to provide in a hydrogen thyratron tube means for preventing formation of hydride deposits on the interior envelope wall surfaces.

A further object is to provide in a hydrogen thyratron tube an improved grid structure for preventing migration of vaporized coating particles to the interior envelope wall surfaces.

Other objects, features, and advantages will become apparent after consideration of the following detailed description and accompanying drawings, in which.

Figure 1:
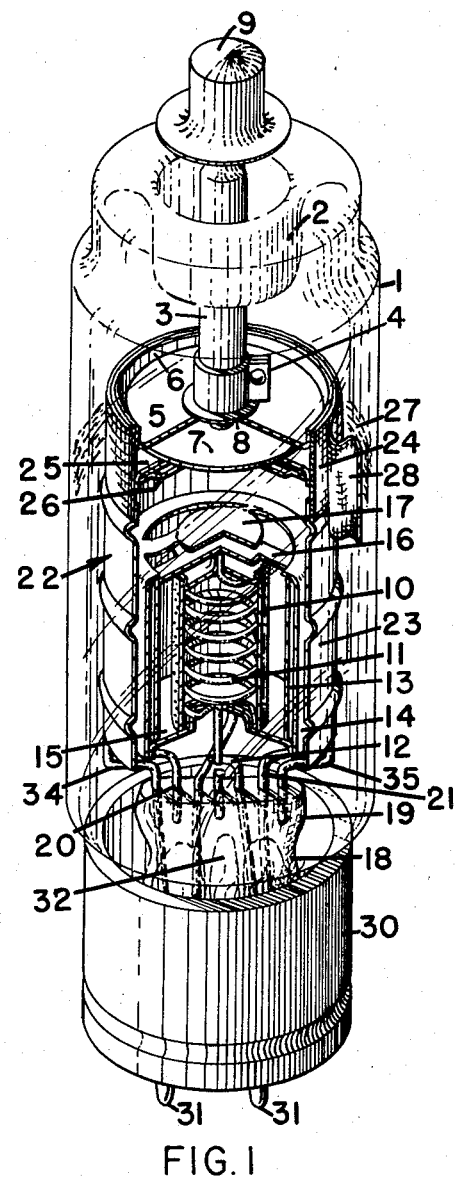
Fig. 1 is a perspective view of the illustrative embodiment of the invention with a portion of the internal structure broken away.

Referring now to Fig. 1, the embodiment shown comprises a glass envelope 1 having a top re-entrant glass seal 2 with a sleeve 3 extending therethrough. Supported at the inner end of the sleeve 3 is a collar 4 attached to transverse disc 5 with a flanged rim 6.

Supported by lead wire 8 extending inside sleeve 3 is the anode electrode 7, spaced a short distance below disc 5 in a manner well-known in the art. Terminal cap 9 is provided at the outer end of lead 8.

Cathode electrode structure includes a nickel cylinder 10 coated with an electron emissive coating, such as barium, strontium and calcium oxide. Heater coil 11 within cylinder 10 is electrically connected to lead-wire 12 which also supports a leg of said coil. Heat shields 13 and 14 surround the cathode cylinder 10 and are supported by a lower cathode disc 15. The upper portion of shield 14 supports baffle structure 16 and 17.

The lower end of envelope 1 has a re-entrant seal 18 terminating in a stem press 19. Lead-wires 20 and 21 extend through the stem press 19 and support the cathode heat shield structure 14. Base 30 is mounted and cemented to the lower portion of envelope 1 and electrode lead-wires are connected to four pins 31.

The envelope may be evacuated and filled with the hydrogen gas under pressure by means of tubulation 32 in glass seal 18. With the embodiment described, anode voltages as high as 20,000 volts may be employed with a gas pressure of approximately 500 to 600 microns of mercury.

The grid structure 22 of the embodiment includes a cylinder 23 having a layer of a conductive wire mesh 24 affixed to its upper portion. The upper edge of grid mesh 24 is attached to flange 6. Grid disc 25 is welded at an intermediate point to grid mesh 24 and has mounted on the underside a grid baffle 26. Lead wires 34 and 35, which extend through glass press 19, support the grid cylinder 23.

Tubes of prior art construction as shown in U. S. Patent 2,497,911 referred to previously employ only a single layer of mesh enclosing the discharge region between the anode and cathode. Coating particles sputtered or vaporized from the cathode cylinder 10 are believed to migrate through the mesh layer to the interior wall surfaces of the envelope trapping a certain amount of the hydrogen gas thereon, in a substantially narrow band in the region indicated generally at 27.

Figure 2:
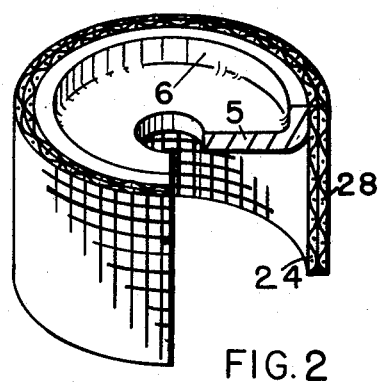
Fig. 2 is an enlarged view of the improved grid structure of the invention.

In accordance with the teachings of the invention, I have successfully eliminated these coating deposits by providing a second layer of the grid mesh attached directly to the first layer. As shown in Fig. 2 the second layer 28 completely surrounds first layer 24. Migratory coating particles appear to be trapped in the interstices of the overlying mesh layer rather than pass to the cooler envelope surfaces. Since the main discharge occurs in the region surrounded by the mesh layers, a higher temperature exists which will prevent any adsorption of the hydrogen gas by the coating particles. As a result of the improvement, hydrogen thyratron tubes tested have operated over longer periods without any indication of hydrogen clean-up prevalent in prior art tubes.

Figure 3:
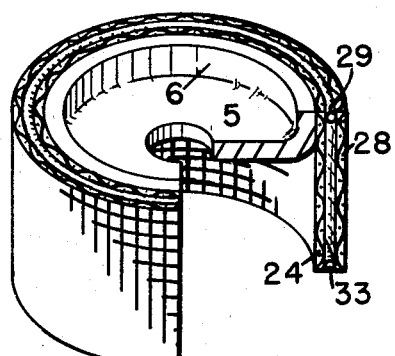
Fig. 3 is an enlarged view of an alternative embodiment of the invention.

An alternative embodiment of the invention is shown in Fig. 3 wherein an annular ring 29 is disposed concentrically around the first grid mesh 24 and affixed to this mesh in the region adjacent the transverse disc flange rim 6. A similar ring 33 is disposed in like manner adjacent the upper portion of grid cylinder 23. The second grid mesh layer 28 is then attached to rings 29 and 33 by conventional techniques such as spot-welding. A space will be defined between the first and second grid layers which will also provide for trapping of vaporized coating particles.

What is claimed is:

1. A hydrogen thyratron tube comprising a glass envelope containing a hydrogen atmosphere, an anode, an indirectly heated cathode and a grid electrode surrounding said anode and cathode, said grid electrode comprising a double layer of a conductive wire mesh with said outer layer providing means for preventing migratory vaporized particles from the cathode from reaching the envelope wall surfaces.

2. A hydrogen thyratron tube according to claim 1 wherein said double layer of conductive wire mesh defines therebetween a space by means of annular metallic members secured adjacent to the top and bottom edges of said mesh.

References Cited in the file of this patent

UNITED STATES PATENTS

| | | |
|---|---|---|
| 2,139,230 | Heising | Dec. 6, 1938 |
| 2,359,769 | Litton | Oct. 10, 1944 |
| 2,430,218 | Eitel | Nov. 4, 1947 |
| 2,518,879 | Germeshausen | Aug. 15, 1950 |